United States Patent
Hummel

(10) Patent No.: US 11,420,513 B2
(45) Date of Patent: Aug. 23, 2022

(54) HYBRID DRIVE TRAIN FOR A HYBRID-DRIVEN MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 762 days.

(21) Appl. No.: 16/343,633

(22) PCT Filed: Oct. 24, 2017

(86) PCT No.: PCT/EP2017/077209
§ 371 (c)(1),
(2) Date: Apr. 19, 2019

(87) PCT Pub. No.: WO2018/077907
PCT Pub. Date: May 3, 2018

(65) Prior Publication Data
US 2019/0329643 A1    Oct. 31, 2019

(30) Foreign Application Priority Data

Oct. 26, 2016 (DE) .................. 10 2016 221 057.2

(51) Int. Cl.
*B60K 6/547* (2007.10)
*B60K 6/36* (2007.10)
(Continued)

(52) U.S. Cl.
CPC ............. *B60K 6/547* (2013.01); *B60K 6/36* (2013.01); *B60K 6/48* (2013.01); *B60K 17/24* (2013.01);
(Continued)

(58) Field of Classification Search
CPC ............. B60W 10/115; B60K 6/547; B60K 2006/4841; B60K 17/24
See application file for complete search history.

(56) References Cited

U.S. PATENT DOCUMENTS 10,272,765 B1 *  4/2019  Cho .................. B60K 6/543
10,549,623 B1 *  2/2020  Park ................. F16H 37/0833
(Continued)

FOREIGN PATENT DOCUMENTS

| CN | 104589994 A | 5/2015 |
|----|-------------|--------|
| DE | 19745995 A1 | 9/1998 |

(Continued)

OTHER PUBLICATIONS

Notification of Transmittal of Translation of the International Preliminary Report on Patentability dated May 9, 2019, in connection with corresponding international Application No. PCT/EP2017/077209 (10 pgs.).

(Continued)

*Primary Examiner* — Jeffrey J Restifo
(74) *Attorney, Agent, or Firm* — Maier & Maier, PLLC

(57) ABSTRACT

A hybrid drivetrain for a hybrid-driven vehicle, having a transmission, which can be shifted by shifting elements into different transmission steps, and which is connectable via an internal combustion engine shaft to an internal combustion engine, via an electric machine shaft to an electric machine, and via an output shaft to at least one vehicle axis. The internal combustion engine shaft and a pinion shaft, which can be connected with respect to drive to the output shaft, are connectable via spur gearwheel sets, which can be shifted by means of shifting elements and which each form wheel levels, of which at least one hybrid wheel level is additionally connectable to the electric machine shaft.

17 Claims, 6 Drawing Sheets

(51) Int. Cl.
*B60K 6/48* (2007.10)
*B60K 17/24* (2006.01)
*F16H 3/091* (2006.01)
*F16H 37/04* (2006.01)
*F16H 3/08* (2006.01)

(52) U.S. Cl.
CPC ............ *F16H 3/091* (2013.01); *F16H 37/04* (2013.01); *B60K 2006/4841* (2013.01); *B60Y 2200/92* (2013.01); *B60Y 2300/18191* (2013.01); *B60Y 2300/19* (2013.01); *B60Y 2400/42* (2013.01); *B60Y 2400/71* (2013.01); *B60Y 2400/79* (2013.01); *F16H 2003/0822* (2013.01); *F16H 2037/047* (2013.01)

(56) References Cited

U.S. PATENT DOCUMENTS

| | | | | |
|---|---|---|---|---|
| 10,843,548 | B1* | 11/2020 | Hwang | B60K 6/38 |
| 10,851,875 | B1* | 12/2020 | Park | B60K 6/387 |
| 2012/0004063 | A1* | 1/2012 | Koyama | B60K 6/48 903/910 |
| 2013/0337972 | A1* | 12/2013 | Lee | B60K 6/365 903/902 |
| 2015/0165888 | A1* | 6/2015 | Lee | B60K 6/365 475/5 |
| 2015/0167806 | A1* | 6/2015 | Lee | F16H 61/0403 180/65.23 |
| 2015/0183311 | A1* | 7/2015 | Lee | B60K 6/547 903/910 |
| 2015/0184732 | A1* | 7/2015 | Lee | F16H 61/0403 180/65.23 |
| 2015/0298536 | A1* | 10/2015 | Märkl | B60K 6/365 903/910 |
| 2016/0167503 | A1* | 6/2016 | Lee | B60K 6/387 903/910 |
| 2016/0176280 | A1* | 6/2016 | Kaltenbach | F16H 3/725 475/5 |
| 2017/0240036 | A1* | 8/2017 | Kobayashi | B60K 6/48 |
| 2018/0029462 | A1* | 2/2018 | Huh | B60K 6/365 |
| 2019/0118636 | A1* | 4/2019 | Hwang | F16H 3/54 |
| 2019/0118638 | A1* | 4/2019 | Hummel | F16H 3/089 |
| 2019/0118642 | A1* | 4/2019 | Cho | F16H 37/065 |
| 2019/0120342 | A1* | 4/2019 | Hwang | F16H 37/046 |
| 2019/0120351 | A1* | 4/2019 | Cho | F16H 37/046 |
| 2019/0178352 | A1* | 6/2019 | Starkey | F16H 47/04 |
| 2019/0263246 | A1* | 8/2019 | Hummel | B60K 6/36 |
| 2019/0263247 | A1* | 8/2019 | Hummel | F16H 3/093 |
| 2019/0270374 | A1* | 9/2019 | Hummel | B60K 6/36 |
| 2019/0323579 | A1* | 10/2019 | Hummel | F16H 3/725 |
| 2019/0329643 | A1* | 10/2019 | Hummel | B60K 6/547 |
| 2019/0383361 | A1* | 12/2019 | Hwang | F16H 61/688 |
| 2019/0383364 | A1* | 12/2019 | Hwang | F16H 3/725 |
| 2020/0047601 | A1* | 2/2020 | Park | B60K 6/547 |
| 2020/0047602 | A1* | 2/2020 | Chae | B60K 6/365 |
| 2020/0047603 | A1* | 2/2020 | Park | F16H 3/093 |
| 2020/0063829 | A1* | 2/2020 | Jang | F16H 3/001 |
| 2020/0063830 | A1* | 2/2020 | Jang | F16H 3/006 |
| 2020/0063835 | A1* | 2/2020 | Hwang | F16H 3/66 |
| 2020/0353809 | A1* | 11/2020 | Park | F16H 3/002 |
| 2020/0355266 | A1* | 11/2020 | Park | F16H 37/0833 |
| 2021/0206256 | A1* | 7/2021 | Hwang | B60K 6/387 |
| 2021/0207688 | A1* | 7/2021 | Hwang | F16H 3/666 |

FOREIGN PATENT DOCUMENTS

| | | |
|---|---|---|
| DE | 60212220 T2 | 4/2007 |
| DE | 102008031456 A1 | 1/2010 |
| DE | 102010030567 A1 | 12/2011 |
| DE | 102011101151 A1 | 12/2011 |
| DE | 112012003012 T5 | 5/2014 |
| DE | 102013005252 A1 | 10/2014 |
| DE | 102013206176 A1 | 10/2014 |
| DE | 102014013579 A1 | 3/2015 |
| DE | 102014210042 A1 | 12/2015 |
| DE | 102014109169 A1 | 1/2016 |
| EP | 2056391 A1 | 5/2009 |
| EP | 2204894 A1 | 7/2010 |
| EP | 2792523 A2 | 10/2014 |
| EP | 2808197 A1 | 12/2014 |
| WO | 2008/138387 A1 | 11/2008 |
| WO | 2010/047207 A1 | 4/2010 |
| WO | 2011/002921 A2 | 1/2011 |
| WO | 2011/064986 A1 | 6/2011 |
| WO | 2014/166745 A1 | 10/2014 |
| WO | 2015/140617 A1 | 9/2015 |

OTHER PUBLICATIONS

European Examination Report dated Sep. 24, 2021, in connection with corresponding EP Application No. 17 788 229.7 (11 pp., including machine-generated English translation).

German Office Action dated Jun. 14, 2021, in connection with corresponding DE Application No. 10 2016 221 057.2 (10 pp., including machine-generated English translation).

German Search Report dated Jul. 14, 2017 in corresponding German Application No. 102016221057.2; 16 pages.

International Search Report dated Feb. 16, 2018 in corresponding International Application No. PCT/EP2017/077209; 30 pages.

* cited by examiner

HYBRID DRIVE TRAIN FOR A HYBRID-DRIVEN MOTOR VEHICLE

FIELD

The invention relates to a hybrid drivetrain for a hybrid-driven motor vehicle.

BACKGROUND

A hybrid drivetrain for a hybrid-driven vehicle is known from EP 2 792 523 A2. It comprises a transmission which can be shifted into different transmission steps by means of shifting elements and which is connectable with respect to drive via an internal combustion engine shaft to an internal combustion engine, via an electric machine shaft to an electric machine, and via an output shaft to at least one vehicle axle. The internal combustion engine shaft is connectable via spur gearwheel sets, which form wheel planes, to a pinion shaft. This pinion shaft in turn outputs on the output shaft via a spur gear step. The wheel levels of the hybrid transmission comprise a hybrid wheel level, which is connected with respect to drive to the electric machine shaft.

SUMMARY

The object of the invention is to provide a hybrid drivetrain, which has greater degrees of freedom in the functionality in a design which is structurally simple and favorable with respect to installation space in comparison to the prior art.

According to the disclosure, in particular at least one shifting element SE-A is arranged on the electric machine shaft, by means of which the electric machine can be decoupled from the hybrid wheel level E1, E2 or connected thereto. In this manner, with shifted internal-combustion-engine gears, the electric machine can be completely decoupled from the drivetrain. The moment of inertia of the activated partial transmission is thus advantageously reduced.

In one technical implementation, the hybrid wheel level E1, E2 can be constructed from an output-side gearwheel arranged on the pinion shaft, a drive-side gearwheel arranged on the internal combustion engine shaft, and a gearwheel arranged on the electric machine shaft. The gearwheel arranged on the electric machine shaft can be designed as a floating gearwheel and can be decoupled by means of the shifting element SE-A from the electric machine shaft or can be coupled thereto.

In one preferred embodiment, the transmission can comprise two hybrid wheel levels E1, E2. The shifting element SE-A arranged on the electric machine shaft can be shifted on both sides and is arranged in the axial direction between the floating gearwheels of the two hybrid wheel levels E1, E2. The shifting element SE-A can either couple the floating gearwheel of the first hybrid wheel level E1 to the electric machine shaft in a first shifting position or can couple the floating gearwheel of the second hybrid wheel level E2 to the electric machine shaft in a second shifting position.

It is preferable if the electric machine shaft is entirely free of fixed gearwheels, which are arranged thereon in a rotationally-fixed manner, of the spur gearwheel sets which form the wheel levels of the transmission.

Moreover, it is preferred if the transmission is designed solely as a spur gear transmission, in which the internal combustion engine shaft, the electric machine shaft, and the output shaft are exclusively connectable to one another with respect to drive via spur gearwheel sets. In this manner, a simply constructed transmission structure is achieved, which is operable substantially more efficiently than a planetary gear.

In a further preferred embodiment, the two hybrid wheel levels can be directly adjacent in the axial direction and can be combined together to form a partial transmission which is deactivated in the transmission mode, i.e., is decoupled from the drivetrain. To implement such a partial transmission, each of the hybrid wheel levels E1, E2 can comprise an output-side gearwheel arranged on the pinion shaft, which is embodied as a floating gearwheel and can be coupled by means of a shifting element SE-B to the pinion shaft. Moreover, the drive-side gearwheels of the two hybrid wheel levels E1, E2 arranged on the internal combustion engine shaft can be embodied as floating gearwheels. They are preferably arranged jointly rotationally-fixed on a drive-side hollow shaft, which is rotationally mounted coaxially on the internal combustion engine shaft and can be coupled via precisely one shifting element, namely SE-C, to the internal combustion engine shaft. The above-mentioned shifting element SE-B arranged on the pinion shaft can be embodied so it can be shifted on both sides and can be arranged in the axial direction between the output-side floating gearwheels of the two hybrid wheel levels E1, E2.

In a second preferred embodiment, the at least one hybrid wheel level E1, E2 can be combined together with a further wheel level V3, V4 to form a partial transmission, which can be deactivated in the transmission mode, i.e., can be decoupled from the drivetrain or made stationary. The above-mentioned further wheel level is free of attachment with respect to the electric machine shaft, in contrast to the hybrid wheel level, and comprises an output-side floating gearwheel rotationally mounted on the pinion shaft, which can be coupled by means of a shifting element SE-D, SE-E to the pinion shaft. It is preferable if the shifting element SE-D, SE-E arranged on the pinion shaft can be shifted on both sides and is arranged in the axial direction between the output-side floating gear levels, which are rotationally mounted on the pinion shaft, of the hybrid wheel level E1, E2 and the further wheel level V3, V4.

The above-mentioned further wheel level V3, V4 can moreover comprise a drive-side floating gearwheel rotationally mounted on the internal combustion engine shaft. This gearwheel can be coupled to the internal combustion engine shaft by means of a shifting element SE-F. It is particularly preferable if the drive-side floating gearwheels, which are rotationally mounted on the internal combustion engine shaft, of the hybrid wheel level E1, E2 and the further wheel level V3, V4 are arranged rotationally fixed on a common drive-side hollow shaft, which is coaxially rotationally mounted on the internal combustion engine shaft and can be coupled via precisely one shifting element SE-F to the internal combustion engine shaft.

In one preferred refinement, the two hybrid wheel levels E1, E2 can each be a component of a first and a second partial transmission T1, T2, which can be deactivated in the transmission mode. In this case, it is preferable if the shifting element SE-F arranged on the internal combustion engine shaft can be shifted on both sides and is arranged in the axial direction between the drive-side hollow shafts of the two partial transmissions T1, T2.

The shifting element arranged on the electric machine shaft can be implemented arbitrarily, for example, as a powershift freewheel clutch in combination with a clutch, as a powershift dual clutch, or from a non-powershift dual synchronizer. Moreover, the electric machine can be attached on the drive side or output side in the transmission. In the case of a drive-side attachment, the gearwheel of the hybrid wheel level E1, E2 arranged on the electric machine shaft can mesh with a drive-side floating gearwheel rotationally mounted on the internal combustion engine shaft. In the case of an output-side attachment, the gearwheel of the hybrid wheel level E1, E2 arranged on the electric machine shaft can mesh with an output-side floating gearwheel rotationally mounted on the pinion shaft.

The above hybrid concept can be implemented in a simple manner building on a conventional manual shift transmission and can be used especially for the front-wheel drive. The rear axle can possibly be mechanically decoupled from the front axle, but is drivable via a separate electric machine to implement a four-wheel-drive. In the above hybrid concept, the electric machine can preferably be positioned at the end of the transmission.

The advantageous embodiments and/or refinements of the invention explained above and/or reflected in the dependent claims can be used individually or also in any arbitrary combination with one another—except, for example, in the cases of unambiguous dependencies or alternatives which cannot be unified.

BRIEF DESCRIPTION OF THE DRAWINGS

The invention and its advantageous embodiments and refinements and the advantages thereof will be explained in greater detail hereafter on the basis of drawings.

In the figures.

DETAILED DESCRIPTION

Figure 1:
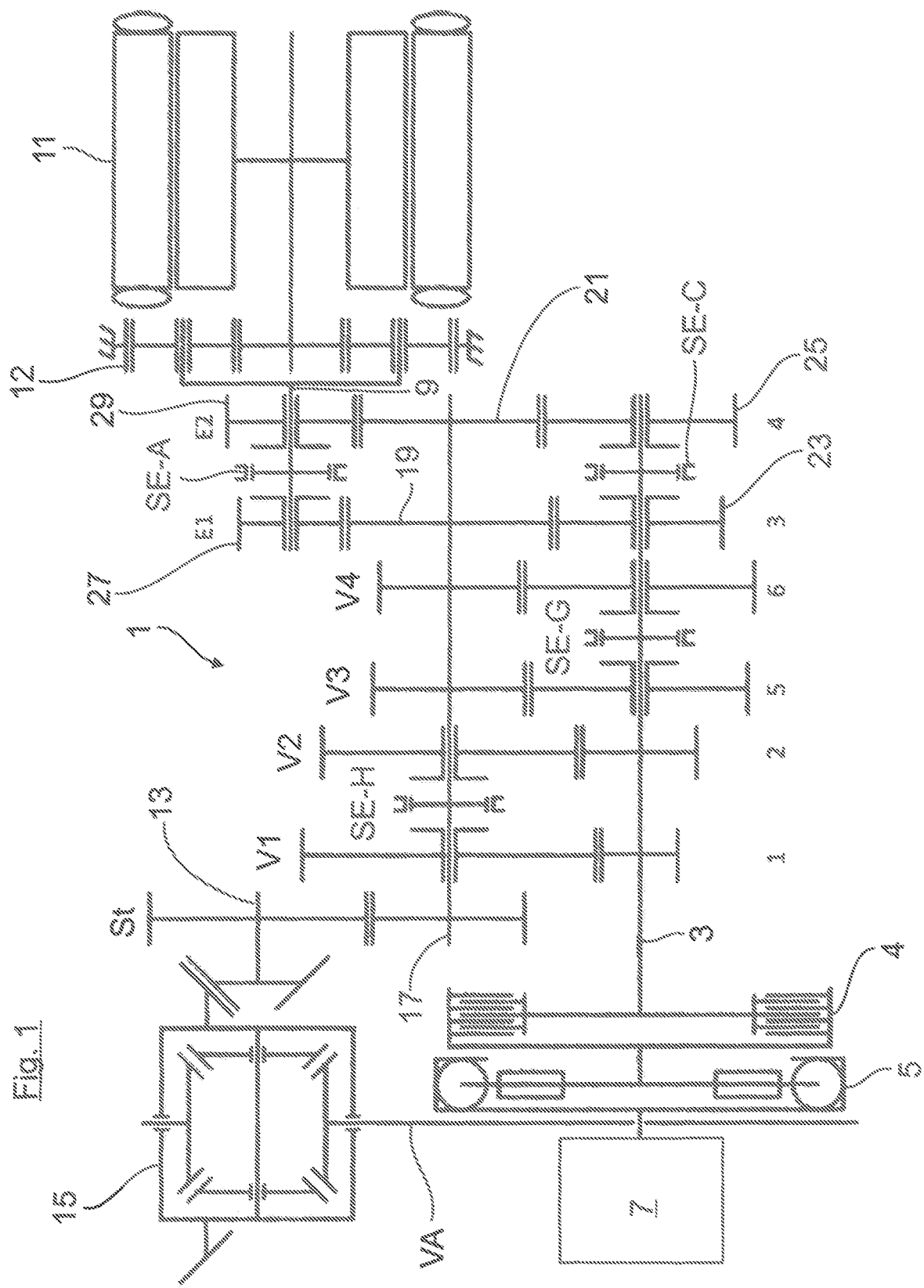
FIG. 1 shows a transmission structure of a hybrid transmission embodied as a spur gear manual shift transmission.

A manual shift transmission 1 is shown in FIG. 1, which is part of a hybrid drivetrain of a hybrid-driven motor vehicle (not shown). The transmission 1, which can be shifted by means of shifting elements into different transmission steps, is connected via an internal combustion engine shaft 3 having interconnected separating clutch 4 and torsion damper 5 to an internal combustion engine 7 and via an electric machine shaft 9 to an electric machine 11. The electric machine 11 can comprise a planetary reduction gear 12 shown in FIG. 1 for a torque conversion. Moreover, the transmission 1 is connected with respect to drive on the output side via an output shaft 13 to a front axle VA of the motor vehicle. The output shaft 13 is operationally connected as a pinion shaft to the bevel drive of a front axle differential 15.

As can furthermore be seen from FIG. 1, the internal combustion engine shaft 3, the electric machine shaft 9, and an interposed pinion shaft 17 are arranged axially-parallel to one another. The pinion shaft 17, the electric machine shaft 9, and the output shaft 13 are connectable to one another with respect to drive via spur gearwheel sets, which can be shifted via the shifting elements. The spur gearwheel sets form the wheel levels V1 to V4 and E1 and E2, which are arranged parallel to one another and which are all located according to FIG. 1 in the axial direction between the internal combustion engine 7 and the electric machine 11.

The transmission structure of the hybrid transmission 1 shown in FIG. 1 is described hereafter: Thus, in FIG. 1, the internal combustion engine shaft 3 and the pinion shaft 17 are connected to one another via wheel levels V1 to V4, which are each constructed from floating and fixed gearwheels meshing with one another. The floating gearwheels of the wheel levels V1 to V4 can be coupled via shifting elements SE-H and SE-G to the respective supporting shaft 3, 17. The wheel levels V1 to V4 are free of attachments with respect to the electric machine shaft 9.

Moreover, two hybrid wheel levels E1, E2 are provided. Each hybrid wheel level E1, E2 comprises an output-side gearwheel 19, 21 arranged on the pinion shaft 17, which meshes respectively with a drive-side gearwheel 23, 25 arranged on the internal combustion engine shaft 3 and with an (electric-machine-side) floating gearwheel 27, 29 arranged coaxially to the electric machine shaft 9. The output-side gearwheels 19, 21 of the hybrid wheel levels E1, E2 are arranged in FIG. 1 as floating gearwheels on the pinion shaft 17, while its drive-side gearwheels 23, 25 are rotationally fixed as floating gearwheels on the internal combustion engine shaft 3. A shifting element SE-C, which can be shifted on both sides, and which either couples the first hybrid wheel level E1 to the internal combustion engine shaft 3 in a first shifting position or couples the second hybrid wheel level E2 to the internal combustion engine shaft 3 in a second shifting position, is arranged between the two drive-side gearwheels 23, 25 of the hybrid wheel levels E1, E2. In the same manner, a shifting element SE-A, which can be shifted on both sides, and using which either the first hybrid wheel level E1 or the second hybrid wheel level E2 can also be coupled to the electric machine shaft 9, is also arranged between the electric-machine-side floating gearwheels 27, 29 of the hybrid wheel levels E1, E2. The pinion shaft 17 outputs on the output shaft 13 via a spur gear step St.

In the neutral position of the shifting element SE-A shown in FIG. 1, the electric machine shaft 9 is decoupled from the drivetrain. In this manner, the electric machine shaft 9 is stationary, i.e., deactivated, in the transmission mode. The moment of inertia of the remaining activated transmission is thus advantageously reduced. However, the gearwheels of the hybrid wheel levels E1, E2 remain activated, i.e., they are co-rotated in the transmission mode in spite of stationary electric machine 11.

Figure 2:
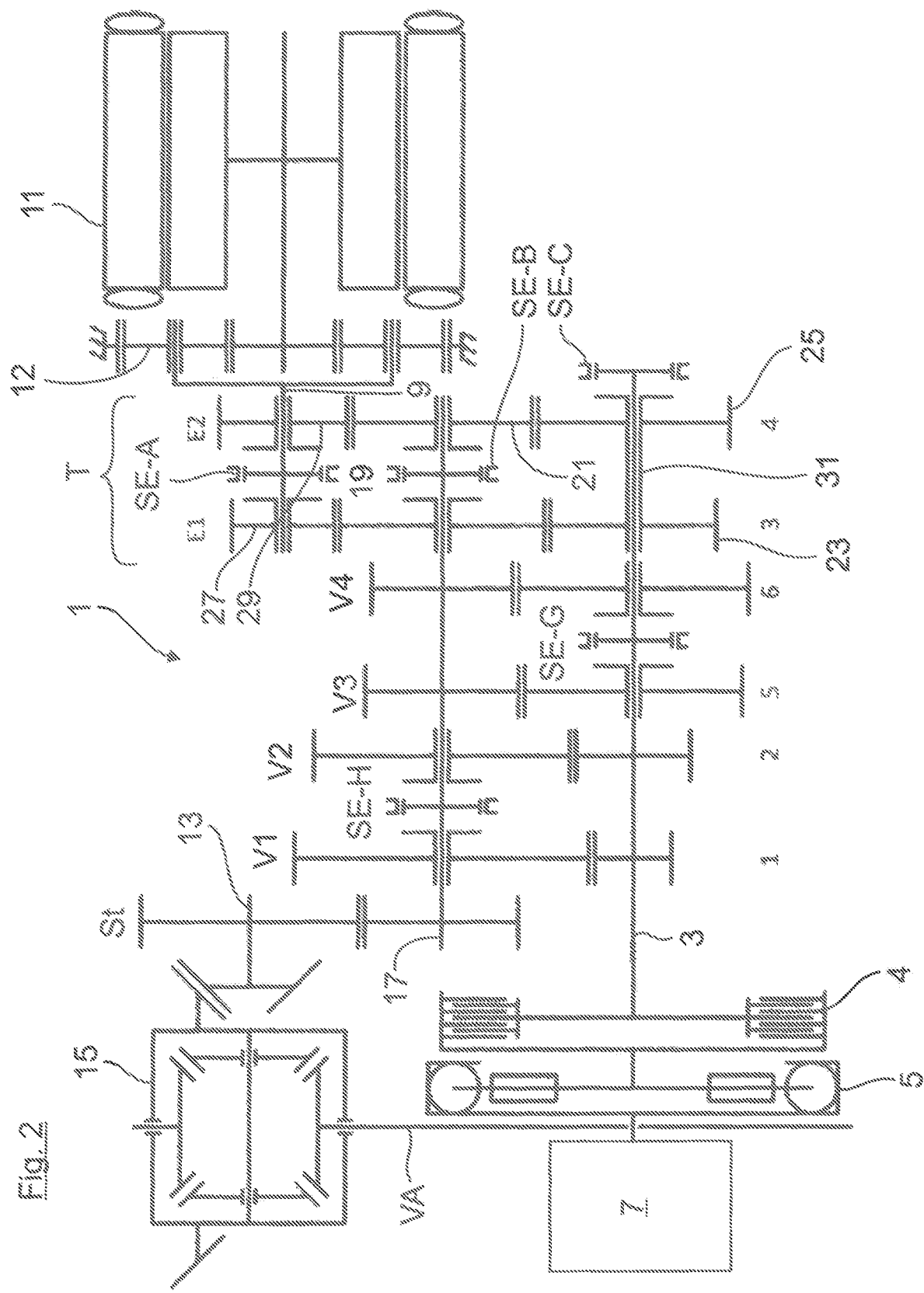
FIG. 2 shows a second exemplary embodiment of the hybrid transmission in a view corresponding to FIG. 1.

In contrast thereto, in FIG. 2, the two hybrid wheel levels E1, E2 are combined to form a common partial transmission T, which can be shifted completely free of torque in the transmission mode, i.e., can be completely decoupled from the drivetrain, so that the partial transmission T is completely stationary. To implement the partial transmission T, the two output-side gearwheels 19, 21 of the hybrid wheel levels E1, E2 are no longer designed as fixed gearwheels in FIG. 2, but rather are rotationally mounted as floating gearwheels on the pinion shaft 17. A shifting element SE-B, which can be shifted on both sides and can either couple the first or the second hybrid wheel level E1, E2 to the pinion shaft, is arranged between the two output-side gearwheels 19, 21 of the hybrid wheel levels E1 and E2. Moreover, in FIG. 2, the two drive-side gearwheels 23, 25 of the hybrid wheel levels E1, E2 are jointly arranged rotationally-fixed on a drive-side hollow shaft 31, which is rotationally mounted coaxially on the internal combustion engine shaft 3. The drive-side hollow shaft 31 can be coupled via precisely one shifting element SE-C to the internal combustion engine shaft 3, in a manner which reduces components.

Figure 3:
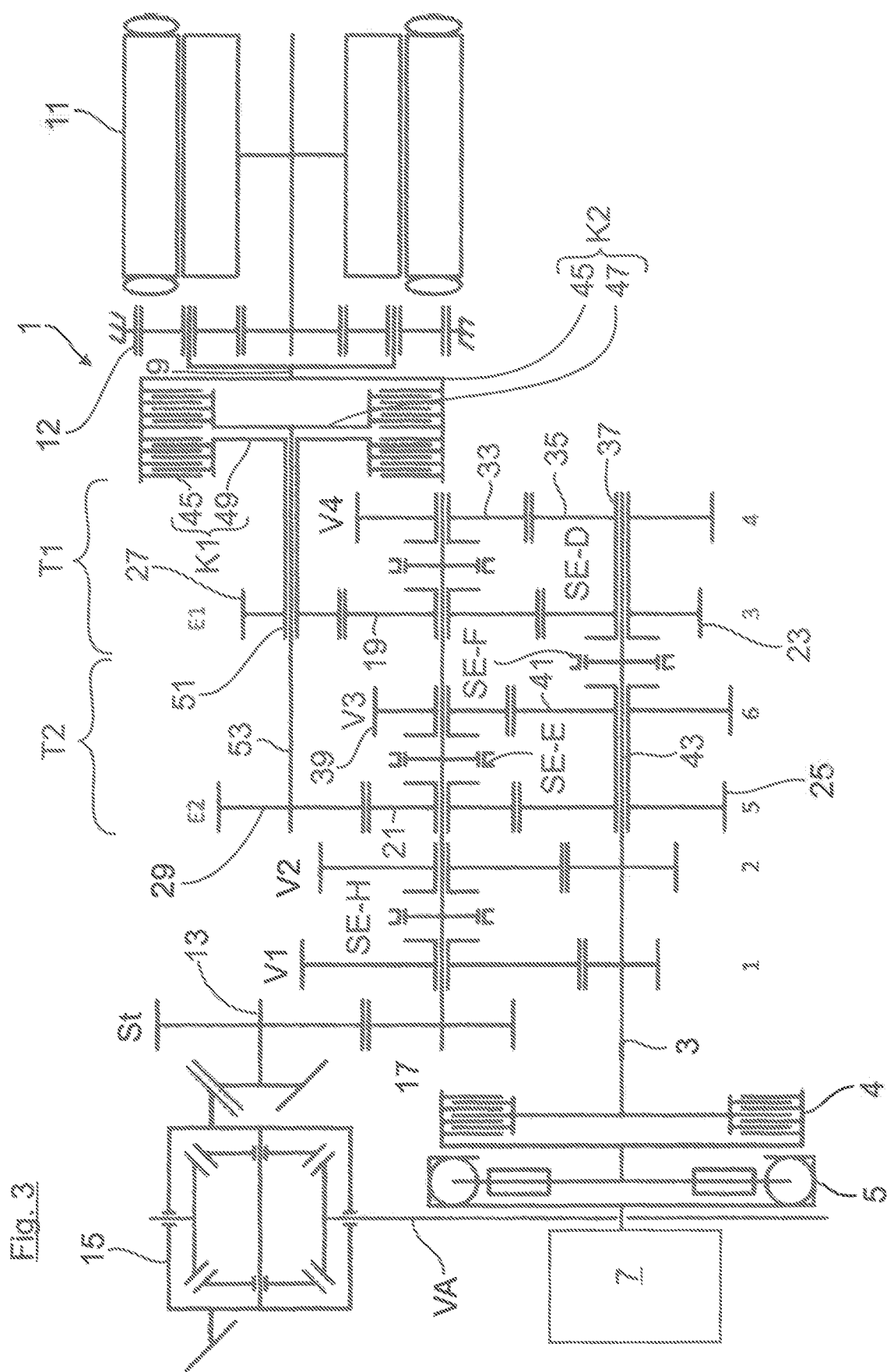
FIG. 3 shows a third exemplary embodiment of the hybrid transmission in a view corresponding to FIG. 1.

In FIG. 3, in contrast to FIG. 2, a total of two partial transmissions T1, T2 are provided, which can be shifted completely torque-free in the transmission mode, i.e., can be completely decoupled from the drivetrain, so that the first partial transmission T1 and/or the second partial transmission T2 is completely stationary. The first hybrid wheel level E1 and a further, directly axially adjacent wheel level V4 are combined in the first partial transmission T1. The second hybrid wheel level E2 and a directly adjacent further wheel level V3 are combined with one another in the second partial transmission T2.

In the first partial transmission T1, the wheel level V4 comprises an output-side floating gearwheel 33 rotationally mounted on the pinion shift 17. The output-side floating gearwheel 33 of the wheel level V4 and the output-side floating gearwheel 19 of the first hybrid wheel level E1 can be alternately coupled to the pinion shaft 17 via a shifting element SE-D, which is arranged therebetween and can be shifted on both sides. Both the first hybrid wheel level E1 and also the wheel level V4 comprise drive-side floating gearwheels 23, 25, which are rotationally mounted on the internal combustion engine shaft 3 and which are jointly arranged rotationally-fixed on a drive-side first hollow shaft 37. This shaft is coaxially rotationally mounted on the internal combustion engine shaft 3 and can be coupled via a shifting element SE-F to the internal combustion engine shaft 3.

The second partial transmission T2 is constructed structurally equivalent to the first partial transmission T1. In the second partial transmission T2, the wheel level V3 comprises an output-side floating gearwheel 39 rotationally mounted on the pinion shaft 17. The output-side floating gearwheel 39 of the wheel level V3 and the output-side floating gearwheel 21 of the second hybrid wheel level E2 can be alternately coupled to the pinion shaft 17 via a shifting element SE-E, which is arranged therebetween and can be shifted on both sides. Both the second hybrid wheel level E2 and also the wheel level V3 comprise drive-side floating gearwheels 25, 41, which are rotationally mounted on the internal combustion engine shaft 3 and which are arranged jointly rotationally-fixed on a drive-side second hollow shaft 43, which is rotationally mounted coaxially on the internal combustion engine shaft 3 and can be coupled via the shifting element SE-F to the internal combustion engine shaft 3. The shifting element SE-F, which is shared by the two hollow shafts 37, 43, can be shifted on both sides and is arranged between the two drive-side hollow shafts 37, 43.

As can furthermore be seen from FIG. 3, the two electric-machine-side gearwheels 27, 29 of the hybrid wheel levels E1, E2 are shifted via a dual clutch, which is constructed from a first clutch K1 and a second clutch K2. The dual clutch has an outer plate support 45, which is connected in a rotationally-fixed manner to the electric machine shaft 9. The outer plate support 45 interacts with two inner plate supports 47, 49 arranged adjacent to one another in the axial direction. The inner plate support 49 is arranged together with the electric-machine-side gearwheel 27 of the first hybrid wheel level E1 in a rotationally-fixed manner on a hollow shaft 51. In contrast, the inner plate support 47 is arranged together with the electric-machine-side gearwheel 29 of the second hybrid wheel level E2 in a rotationally-fixed manner on a solid shaft 53, which extends coaxially through the hollow shaft 51.

The transmission shown in FIG. 3 comprises a total of 16 gearwheels, four synchronizers, and two clutches K1, K2. Up to ten internal-combustion-engine gears can be shifted in the transmission 1, i.e., the six internal-combustion-engine direct gears VM1 to VM6 explained hereafter, which only use one wheel level, and the four torsion gears VM7 to VM10, which use at least two wheel levels:

In the direct gears VM1 and VM2, the shifting element SE-H is shifted to the left or right, respectively, while the two partial transmissions T1, T2 are stationary.

In the direct gear VM3, SE-F is shifted to the right and SE-D is shifted to the left. I.e., the partial transmission T1 is activated and the partial transmission T2 is deactivated. This also applies to the direct gear VM4, in which SE-F is shifted to the right and SE-D is also shifted to the right.

In the following direct gears VM5 and VM6, the partial transmission T2 is activated and the partial transmission T1 is deactivated. In the direct gear VM5, SE-F is shifted to the left and SE-E is shifted to the right. In the direct gear VM6, SE-F is shifted to the left and SE-E is shifted to the right.

Of the following four internal-combustion-engine torsion gears VM7 to VM10, in the gear VM7, the shifting element SE-F is shifted to the right, the clutches K1 and K2 are actuated, and the shifting element SE-E is shifted to the left. In the torsion gear VM8, SE-F is shifted to the right, the two clutches K1, K2 are actuated, and SE-E is shifted to the right. In the torsion gear VM9, SE-F is shifted to the left, the two clutches K1, K2 are actuated, and SE-D is shifted to the left. In the torsion gear VM10, SE-F is shifted to the left, the two clutches K1, K2 are actuated, and SE-D is shifted to the right.

In the solely electromotive mode of the transmission 1 shown in FIG. 3, up to 8 electromotive gears can be shifted, i.e., the following two direct gears EM1, EM2 and the six torsion gears EM3 to EM8:

Thus, in the direct gear EM1, the clutch K1 is actuated and the shifting element SE-D is shifted to the left. In the direct gear EM2, the clutch K2 is actuated and the shifting element SE-E is shifted to the left. In the electromotive torsion gear EM3, the clutch K1 is actuated and SE-D is shifted to the right. In the torsion gear EM4, the clutch K1 is actuated and SE-F is shifted to the right and SE-H is shifted to the left. In the torsion gear E5, the clutch K1 is actuated, SE-F is shifted to the right, and SE-H is shifted to the right. In the torsion gear EM6, the clutch K2 is actuated and SE-E is shifted to the right. In the torsion gear EM7, the second clutch K2 is actuated, SE-F is shifted to the left, and SE-H is shifted to the left. In the torsion gear EM8, the clutch K2 is actuated, SE-F is shifted to the left and SE-H is shifted to the right.

From the above internal-combustion-engine gears VM1 to VM10 and the electromotive gears EM1 to EM8, up to 28 hybrid gears can be implemented in combination, in which electromotive and internal-combustion-engine gears are shifted in combination.

Special driving operating modes are highlighted hereafter, which are implementable by means of the transmission shown in FIG. 3:

Thus, stationary charging of the electric machine 11 is enabled using the transmission structure shown in FIG. 3, if the vehicle is at a vehicle standstill, for example, at a traffic signal or in a traffic jam. In this case, for example, the shifting element SE-F can be actuated to the right to connect the internal combustion engine shaft 3 to the first hybrid wheel level E1. At the same time, the clutch K1 (consisting of the outer plate support 45 and the inner plate support 49) is closed to connect the first hybrid wheel level E1 to the electric machine shaft 9. A torque flow can thus take place from the internal combustion engine 7 via the internal combustion engine shaft 3, the first hybrid wheel level E1, and the closed clutch K1 up to the electric machine 11. Moreover, an internal combustion engine start can be carried out with the aid of the electric machine 11. The electric machine 11 can start the internal combustion engine 7 via a load path in which, for example, the second clutch K2 (consisting of the outer plate support 45 and the inner plate support 47) is closed and the shifting element SE-F is actuated to the left.

Furthermore, in FIG. 3, a shifting procedure between the internal-combustion-engine gears 1 to 6 can take place with the aid of the electric machine 11 without interruption of traction force, specifically, for example, with the aid of the electromotive gears EM1, EM2, which act as support gears during the internal-combustion-engine shifting. Such a shifting procedure is started with opening of the separating clutch 4 to decouple the internal combustion engine 7 from the transmission 1. An engaged electromotive support gear provides a support load path, which extends from the electric machine 11 to the drive side, during the shifting procedure taking place between the internal-combustion-engine gears. During the shifting procedure (i.e., the internal combustion engine 7 is decoupled from the drivetrain by means of the separating clutch 4), the electric machine 11 can thus generate a drive torque which is transmitted via the support load path to the output side.

The above state of affairs is explained hereafter on the basis of a shifting procedure free of an interruption of traction force between the third and fourth internal-combustion-engine gears, in which the electromotive second gear EM2 acts as a support gear: Thus, in the transmission 1 of FIG. 3, in the internal-combustion-engine third gear VM3, the shifting element SE-F is shifted to the right and the shifting element SE-D is shifted to the left. A load path thus extends from the internal combustion engine 7, the partial transmission T1, and the pinion shaft 17 up to the output-side spur gear drive St, while the partial transmission T2 is deactivated (stationary). At the beginning of the shifting procedure, the separating clutch 4 is disengaged and the shifting element SE-D is shifted into its neutral position. Moreover, the electromotive gear EM2, which acts as a support gear, is engaged, i.e., the plate clutch K2 is closed and the shifting element SE-E is shifted to the left, and the electric machine 11 is started up. A load transmission thus takes place from the electric machine 11 to the output side, during which the electric machine 11 generates an arbitrarily settable torque.

The shifting procedure into the target gear VM4 is continued by shifting the shifting element SE-D to the right from its neutral position. A load path is thus prepared from the internal combustion engine 7 via the shifting element SE-F, the wheel level V4, the shifting element SE-D, and the pinion shaft 17 up to the output-side spur gear drive St. At the end of the shifting procedure, the separating clutch 4 is closed again, i.e., the internal combustion engine 7 switches on, and the electric machine 11 is shut down again, so that the target gear VM4 is shifted and once again a load transmission takes place from the internal combustion engine 7 to the output side.

Therefore, any shift can be supported by means of an electromotive support gear in the transmission 1 of FIG. 3, in contrast to FIG. 2, in which especially a shifting procedure between the internal-combustion-engine third gear VM3 and the internal-combustion-engine fourth gear VM4, i.e., between the hybrid wheel levels E1 and E2, cannot be supported by means of an electromotive gear. In the transmission 1 shown in FIG. 2, a support load path cannot be provided by the electric machine 11 during the above shifting procedure, since both the internal combustion engine 7 and also the electric machine 11 output on the pinion shaft 17 via a common shifting element SE-B. Therefore, shifting free of interruption of traction force between the third and fourth internal-combustion-engine gears is not possible in FIG. 2.

Moreover, an electromotive start from a vehicle standstill or a boost mode, in which multiple electromotive gears are available for boosting for individual internal-combustion-engine gears, is enabled by means of the transmission 1 shown in FIG. 3.

Figure 4:
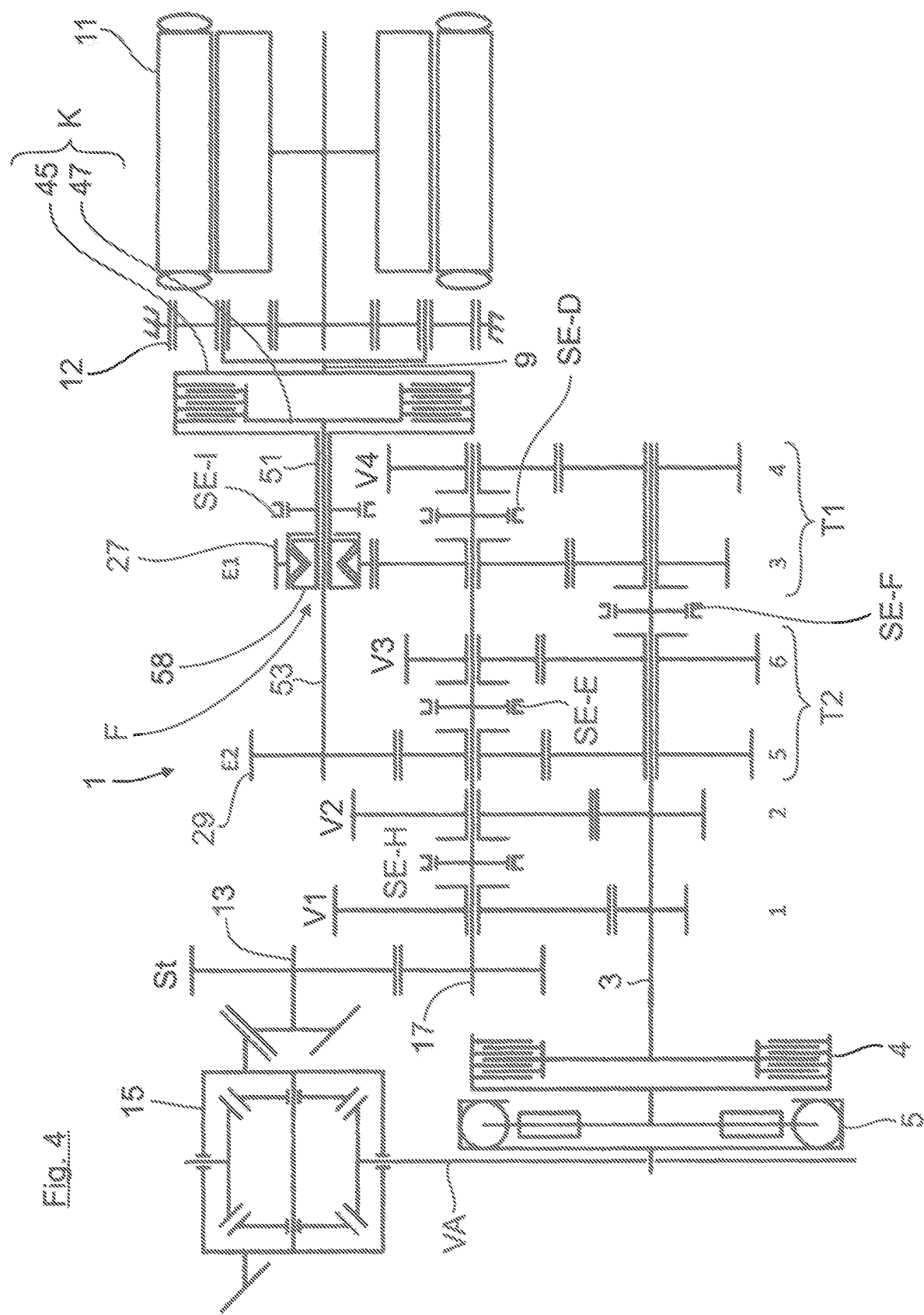
FIG. 4 shows a modification of FIG. 3.
Figure 5:
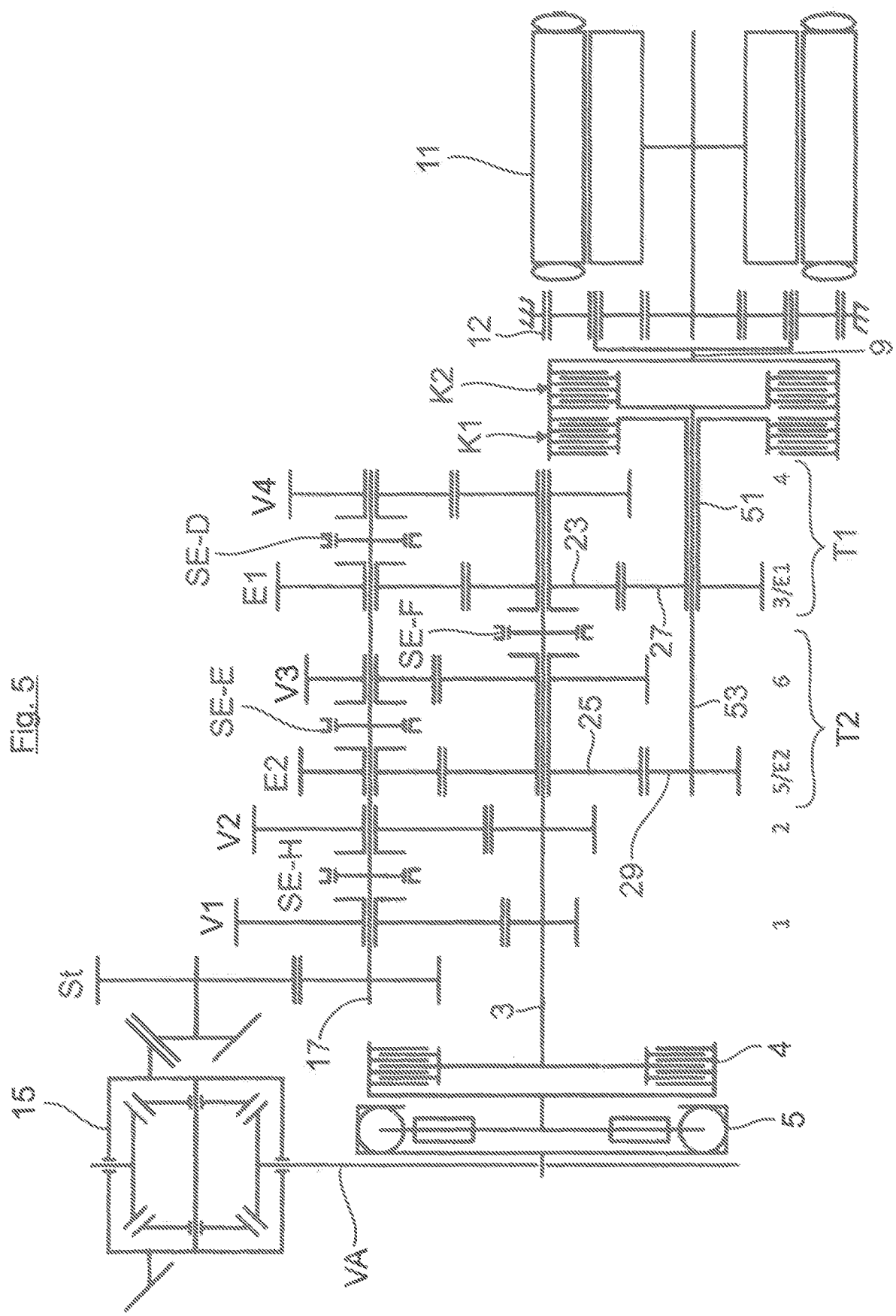
FIG. 5 shows a modification of FIG. 3.
Figure 6:
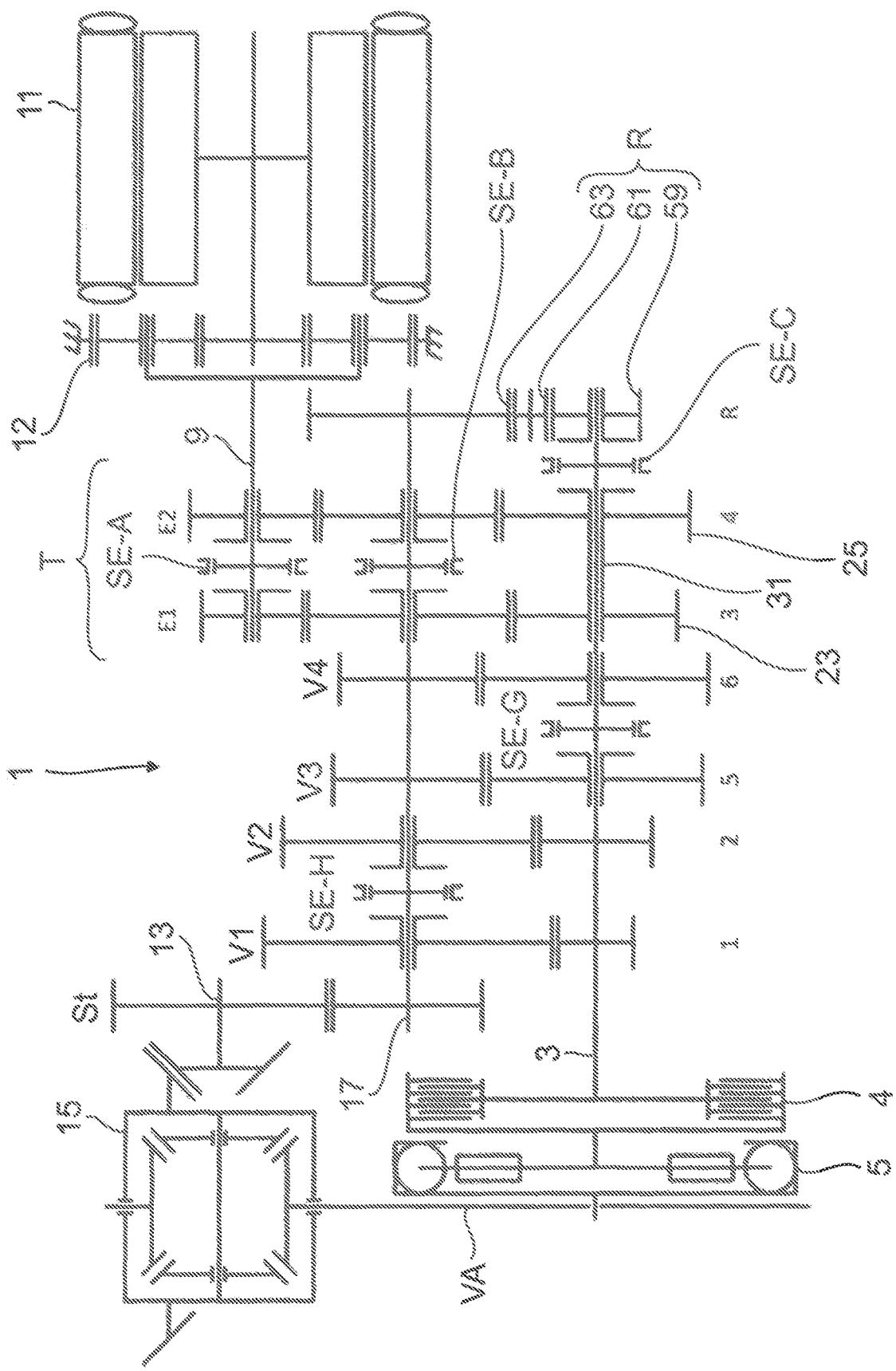
FIG. 6 shows a modification of FIG. 2.

Modifications of the transmission 1 shown in FIG. 3 are described on the basis of following FIGS. 4 to 6:

Thus, in FIG. 4, the two electric-machine-side gearwheels 27, 29 of the hybrid wheel levels E1, E2 are not connectable to the electric machine shaft 9 via a dual clutch (FIG. 3) or via a dual synchronizer (FIG. 2), but rather instead of this by means of a freewheel clutch F and a plate clutch K. The plate clutch K comprises an outer plate support 45, which is attached rotationally-fixed on both the electric machine shaft 9 and also the hollow shaft 51. The outer plate support 45 acts on an inner plate support 47. This support is arranged rotationally-fixed together with the gearwheel 29 of the hybrid level 1 on the solid shaft 53, which extends coaxially through the hollow shaft 51. The electric-machine-side gearwheel 27 of the first hybrid wheel level E1 is connectable via the freewheel clutch F to the hollow shaft 51. The freewheel clutch F is associated with a shifting element SE-I, which can be shifted into two operating positions: In the operating position shown, a torque transmission is enabled from the electric machine shaft 9 via the outer plate support 45 and via the hollow shaft 51 in the direction toward the electric-machine-side gearwheel 27 of the first hybrid wheel level E1 and the freewheel function is activated in the opposite direction, i.e., a torque transmission is prevented. If the freewheel clutch inner side 58 connected to the hollow shaft 51 thus rotates faster than the electric-machine-side gearwheel 27, the hollow shaft 51 drives the gearwheel 27. In a second operating position, the shifting element SE-I is shifted to the left in FIG. 4. In this case, a torque transmission is enabled in both directions. The electromotive gears can be powershifted both in FIG. 4 and also in FIG. 3, while the electromotive gears cannot be powershifted in FIG. 1 or 2.

In FIG. 5, the electric machine 11 is no longer attached on the output side to the transmission 1 (as in FIGS. 1 to 4), but rather is attached on the drive side to the transmission 1. In such a drive-side attachment, the gearwheels 27, 29 of the hybrid wheel levels E1 and E2 no longer mesh with the output-side gearwheels 19, 21 of the hybrid wheel levels E1 and E2, but rather with the drive-side gearwheels 23, 25 of the hybrid wheel levels E1 and E2.

An electromotive reverse gear is provided in FIGS. 1 to 5, in which the electric machine 11 is to be operated in the reverse direction. In contrast thereto, in FIG. 6, the transmission 1 comprises an additional reverse gearwheel level R, which is designed as a spur gear set. The reverse gearwheel level R is constructed from a drive-side gearwheel 59 mounted floating on the internal combustion engine shaft 3, an intermediate gearwheel 61 meshing therewith, and an output-side gearwheel 63 mounted rotationally fixed on the pinion shaft 17, which meshes with the intermediate gearwheel 61. The fundamental construction of the transmission structure shown in FIG. 6 is substantially structurally equivalent to the transmission structure shown in FIG. 2, with the exception of the additional reverse gearwheel level R, which is arranged in axial direction between the second wheel level E2 and the planetary reduction gear 12. Moreover, the shifting element SE-C, in contrast to FIG. 2, is designed so it can be shifted on both sides in FIG. 6 and is positioned in the axial direction between the drive-side hollow shaft 31 and the drive-side floating gearwheel 59. In the event of a shift actuation to the right, the internal combustion engine 3 is connected with respect to drive to the reverse gear level R via the shifting element SE-C.

The invention claimed is:

1. A hybrid drivetrain for a hybrid-driven vehicle, comprising:
    a transmission, which is shiftable by shifting elements into different transmission steps and which is connectable via an internal combustion engine shaft to an internal combustion engine, via an electric machine shaft to an electric machine, and via an output shaft to at least one vehicle axis,
    wherein the internal combustion engine shaft and a pinion shaft, which are connectable to the output shaft, are connectable via spur gearwheel sets, which is shiftable by the shifting elements and which each form wheel levels, of which at least one hybrid wheel level is additionally connectable to the electric machine shaft, and
    wherein at least one shifting element is arranged on the electric machine shaft, by which the hybrid wheel level is decoupled from the electric machine or coupled thereto.

2. The drivetrain as claimed in claim 1, wherein the hybrid wheel level includes an output-side gearwheel arranged on the pinion shaft, a drive-side gearwheel arranged on the internal combustion engine shaft, and an electric-machine-side gearwheel, and
    wherein the electric-machine-side gearwheel arranged on the electric machine shaft is rotationally mounted as a floating gearwheel on the electric machine shaft and is decoupled from the electric machine shaft or coupled thereto by the at least one shifting element.

3. The drivetrain as claimed in claim 2, wherein the transmission includes precisely two hybrid wheel levels,
    wherein the at least one shifting element arranged on the electric machine shaft is shiftable on both sides and is arranged in the axial direction between the floating gearwheels of the two hybrid wheel levels,
    wherein the at least one shifting element is decoupled in a neutral position from the two hybrid wheel levels and the at least one shifting element either couples the floating gearwheel of the first hybrid wheel level to the electric machine shaft in a first shifting position or couples the floating gearwheel of the second hybrid wheel level to the electric machine shaft in a second shifting position.

4. The drivetrain as claimed in claim 2, wherein the output-side gearwheel, which is arranged on the pinion shaft, of the at least one hybrid wheel level is a floating gearwheel, which is coupleable by a shifting element to the pinion shaft, and
    wherein the drive-side gearwheel, which is arranged on the internal combustion shaft, of the hybrid wheel level is a floating gearwheel, which is coupleable by a third shifting element to the internal combustion engine shaft.

5. The drivetrain as claimed in claim 4, wherein the second shifting element arranged on the pinion shaft is shiftable on both sides and is arranged in an axial direction between the output-side floating gearwheels of the two hybrid wheel levels, and
    wherein the shifting element couples the output-side floating gearwheel of the first hybrid wheel level to the pinion shaft in a first shifting position or couples the output-side floating gearwheel of the second hybrid wheel level to the pinion shaft in a second shifting position.

6. The drivetrain as claimed in claim 5, wherein a further wheel level is directly adjacent to the hybrid wheel level, which is free of attachments with respect to the electric machine shaft and includes an output-side floating gearwheel, which is rotationally mounted on the pinion shaft and is coupleable by a fourth shifting element to the pinion shaft,
    wherein the fourth shifting element arranged on the pinion shaft is shiftable on both sides and is arranged in the axial direction between the output-side floating gearwheels, which are rotationally mounted on the pinion shaft, of the hybrid wheel level and the further wheel level, and
    wherein the fourth shifting element is decoupled in a neutral position from the hybrid wheel level and from the further wheel level and the shifting element couples the output-side floating gearwheel of the further wheel level to the pinion shaft in a first shifting position or couples the output-side floating gearwheel of the hybrid wheel level to the pinion shaft in a second shifting position.

7. The drivetrain as claimed in claim 6, wherein the hybrid wheel level and the further wheel level are components of a partial transmission, which can be made stationary during the transmission mode,
    wherein, in the partial transmission, the further wheel level includes a drive-side floating gearwheel, which is rotationally mounted on the internal combustion engine shaft, and is coupleable by a fifth shifting element to the internal combustion engine shaft, and
    wherein the floating gearwheels, which are rotationally mounted on the internal combustion engine shaft, of the hybrid wheel level and the further wheel level are arranged rotationally-fixed on an output-side hollow shaft, which is rotationally mounted coaxially on the internal combustion engine shaft and can be coupled via the fifth shifting element to the internal combustion engine shaft.

8. The drivetrain as claimed in claim 7, wherein the two hybrid wheel levels are each a component of a first and a second partial transmission, and the fifth shifting element arranged on the internal combustion engine shaft is shiftable on both sides and is arranged in the axial direction between the drive-side hollow shafts of the two partial transmissions, and
    wherein the fifth shifting element is decoupled from both hollow shafts in a neutral position and the fifth shifting element either couples the drive-side hollow shaft of the first partial transmission to the internal combustion engine shaft in a first shifting position or couples the drive-side hollow shaft of the second partial transmission to the internal combustion engine shaft in a second shifting position.

9. The drivetrain as claimed in claim 7, wherein the electric machine is attached on a drive side, and for the drive-side attachment of the electric machine, the electric-machine-side gearwheel of the hybrid wheel level meshes with the drive-side floating gearwheel rotationally mounted on the internal combustion engine shaft.

10. The drivetrain as claimed in claim 6, wherein the electric machine is attached on an output side, and for the output-side attachment of the electric machine, the electric-machine-side gearwheel of the hybrid wheel level meshes with the output-side floating gearwheel rotationally mounted on the pinion shaft.

11. The drivetrain as claimed in claim 4, wherein the two hybrid wheel levels are components of a partial transmission, which can be made stationary during the transmission mode, and wherein, in the partial transmission, the drive-side floating gearwheels, which are arranged on the internal combustion engine shaft, of the two hybrid wheel levels are arranged jointly rotationally-fixed on a hollow shaft, which is rotationally mounted coaxially on the internal combustion engine shaft, and is coupleable via the third shifting element to the internal combustion engine shaft.

12. The drivetrain as claimed in claim 1, wherein the electric machine shaft is free of fixed gearwheels, which are arranged thereon in a rotationally-fixed manner, of the spur gearwheel sets forming the wheel levels.

13. The drivetrain as claimed in claim 1, wherein the pinion shaft is connected via a spur gear step to the output shaft, and wherein all wheel levels are arranged in an axial direction between the spur gear step and at least one of the electric machine and the at least one hybrid wheel level.

14. The drivetrain as claimed in claim 1, wherein the electric machine shaft is connected via a first shifting element to the first hybrid level and is connected using a second shifting element to the second hybrid level.

15. The drivetrain as claimed in claim 14, wherein the electric-machine-side gearwheel of the first hybrid wheel level is arranged on a hollow shaft coaxial to the electric machine shaft, wherein the hollow shaft is connectable via the first shifting element to the electric machine shaft, wherein the electric-machine-side gearwheel of the second hybrid level is arranged in a rotationally-fixed manner on a solid shaft guided coaxially through the hollow shaft, and wherein the solid shaft is connectable via the second shifting element.

16. The drivetrain as claimed in claim 15, wherein the first shifting element is a freewheel clutch, and the electric-machine-side gearwheel of the first hybrid wheel level is connectable via the freewheel clutch to the hollow shaft attached in a rotationally-fixed manner to the electric machine shaft, and the freewheel clutch is associated with a shifting element, and wherein the shifting element permits a torque transmission from the electric machine shaft to the hollow shaft and suppresses it in the opposite direction in a first shifting position, and permits the torque transmission in both directions in a second shifting position.

17. The drivetrain as claimed in claim 16, wherein the second shifting element is a clutch, using which the solid shaft is connectable to the electric machine shaft, and wherein an outer plate support of the clutch is fixedly attached to both the electric machine shaft and also the hollow shaft.

\* \* \* \* \*